United States Patent
Streete et al.

(10) Patent No.: US 9,774,600 B1
(45) Date of Patent: Sep. 26, 2017

(54) METHODS, SYSTEMS, AND COMPUTER READABLE MEDIUMS FOR MANAGING INFRASTRUCTURE ELEMENTS IN A NETWORK SYSTEM

(71) Applicant: VCE Company, LLC, Richardson, TX (US)

(72) Inventors: Jonathan P. Streete, San Jose, CA (US); Nicholas A. Hansen, Willow Spring, NC (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 0 days.

(21) Appl. No.: 14/262,072

(22) Filed: Apr. 25, 2014

(51) Int. Cl.
H04L 29/06 (2006.01)

(52) U.S. Cl.
CPC .................................... *H04L 63/10* (2013.01)

(58) Field of Classification Search
CPC ........................................................ H04L 63/10
See application file for complete search history.

(56) References Cited

U.S. PATENT DOCUMENTS

| | | | |
|---|---|---|---|
| 6,308,205 B1 * | 10/2001 | Carcerano et al. | 709/221 |
| 7,007,093 B2 * | 2/2006 | Spicer et al. | 709/229 |
| 8,260,893 B1 * | 9/2012 | Bandhole et al. | 709/223 |
| 8,732,294 B1 * | 5/2014 | Rice et al. | 709/224 |
| 2006/0048077 A1 * | 3/2006 | Boyles | G06F 3/0481 715/853 |
| 2007/0061375 A1 * | 3/2007 | Brown et al. | 707/200 |
| 2007/0070901 A1 * | 3/2007 | Aloni et al. | 370/230 |
| 2009/0119756 A1 * | 5/2009 | Acuna et al. | 726/5 |
| 2011/0125895 A1 * | 5/2011 | Anderson | H04L 9/3213 709/224 |
| 2013/0305242 A1 * | 11/2013 | Wang et al. | 718/1 |
| 2014/0007095 A1 * | 1/2014 | Campion et al. | 718/1 |
| 2014/0068032 A1 * | 3/2014 | Kannan et al. | 709/221 |
| 2014/0173065 A1 * | 6/2014 | Sears | 709/221 |
| 2014/0324793 A1 * | 10/2014 | Glazemakers | 707/692 |

* cited by examiner

*Primary Examiner* — Jason C Chiang
(74) *Attorney, Agent, or Firm* — Jenkins, Wilson, Taylor & Hunt, P.A.

(57) ABSTRACT

Methods, systems, and computer readable mediums for managing infrastructure elements in a network system are disclosed. According to one example, the method includes establishing, for an application managed by a system administrator, an application control configuration that designates administrative access to infrastructure elements supporting a plurality of workload services that executes the application. The method further includes detecting a modification to the application that causes one or more of the workload services to be transferred to at least one auxiliary infrastructure element and updating, in response to the detected modification, the application control configuration such that the administrative access is revised to enable the system administrator to manage each of the infrastructure elements supporting the workload services executing the modified application.

18 Claims, 4 Drawing Sheets

METHODS, SYSTEMS, AND COMPUTER READABLE MEDIUMS FOR MANAGING INFRASTRUCTURE ELEMENTS IN A NETWORK SYSTEM

TECHNICAL FIELD

The subject matter described herein relates to the dynamic configuration of administrative access to network system components. More specifically, the subject matter relates to methods, systems, and computer readable mediums for managing infrastructure elements in a network system.

BACKGROUND

Presently, administrative control and management of infrastructure elements (e.g., components, devices, virtual machines, etc.) in a network system are generally assigned to system administrators operating in accordance with designated "roles" and/or tasks. For example, applications, storage devices, network switches, and firewalls deployed in a network system are each respectively managed by a separate system administrator responsible for a specified role. Typically, modifications to an application require an administrator to convene with other system administrators managing other roles to facilitate any necessary changes to impacted infrastructure elements related to a modified application. However, the aforementioned process is largely inefficient and can significantly impact the operation of a business entity in the event of a disaster recovery situation.

Prior to the introduction and implementation of a new application, an administrator of an application can similarly collaborate with other system administrators in order to determine the configuration changes for all of the infrastructure elements required to execute and/or support the application. The result of the process typically produces a set of configuration changes associated with the infrastructure elements that can be utilized by the application in the event a failure occurs. However, this approach may also prove to be inefficient and unproductive since administrators are required to effectively predict numerous failure scenarios and subsequently pre-configure all potentially impacted infrastructure elements based on each anticipated failure event. Furthermore, this pre-configuring procedure may present an opportunity for security breaches of the infrastructure.

SUMMARY

Methods, systems, and computer readable mediums for managing infrastructure elements in a network system are disclosed. According to one embodiment, the method includes establishing, for an application managed by a system administrator, an application control configuration that designates administrative access to infrastructure elements supporting a plurality of workload services that executes the application. The method further includes detecting a modification to the application that causes one or more of the workload services to be transferred to at least one auxiliary infrastructure element and updating, in response to the detected modification, the application control configuration such that the administrative access is revised to enable the system administrator to manage each of the infrastructure elements supporting the workload services executing the modified application.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable mediums for managing infrastructure elements in a network system. In some embodiments, the disclosed subject matter provides a system administrator the ability to administratively access all infrastructure elements (i.e., both shared and dedicated) that are utilized by an application managed by the system administrator. Notably, the administrative access is afforded to the system administrator in an automatic and immediate manner that does not require the involvement of other system administrators that are tasked with managing the aforementioned infrastructure elements. For example, the disclosed subject matter may establish an application control configuration that initially designates the appropriate administrative access to the infrastructure elements (e.g., servers, firewalls, load balancers, etc.) that host or support the workload services (e.g., subprograms, processes, etc.) associated with the execution and operation of an application managed by the system administrator. Upon detecting a modification to the application, such as the addition, removal, and/or replacement of an auxiliary infrastructure element in the network system, the disclosed subject matter may dynamically update the application control configuration such that the system administrator is immediately enabled to access and manage each of the infrastructure elements presently supporting the workloads of the modified application. Thus, by enabling a more agile and responsive administrative environment, the disclosed subject matter can be utilized to effectively remove the need to predict failure scenarios or to pre-configure infrastructure elements or devices, thereby improving network security and reducing system down-time.

In some embodiments, the disclosed subject matter can be utilized within a network system that is distributed among a plurality of disparate network segments. For example, the network segments may either be partitioned within a single geographical location (e.g., a single data center) or among a plurality of geographical locations or sites (e.g., geographically separated data centers). In some embodiments, the network system can include a converged infrastructure system (CIS). As used herein, a CIS, such as a Vblock™ System from VCE Company, LLC, can comprise multiple converged infrastructure elements (CIEs) in a preconfigured or prepackaged computing platform. For example, a CIS can include a single computing platform unit associated with racks of physical CIEs and related software for performing virtualization and/or other information technology (IT) functions. In some embodiments, each CIE associated with a CIS can comprise a compute component, a software component, a networking component, a hardware component, or a firmware component. For example, a CIS can comprise data storage devices, compute devices (e.g., a unified computing system device), networking equipment (e.g., switch devices), and software for managing physical resources and/or virtualized resources (e.g., virtual servers). In some embodiments, both the distributed network system and CIS architecture may be utilized jointly together without departing from the scope of the disclosed subject matter.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
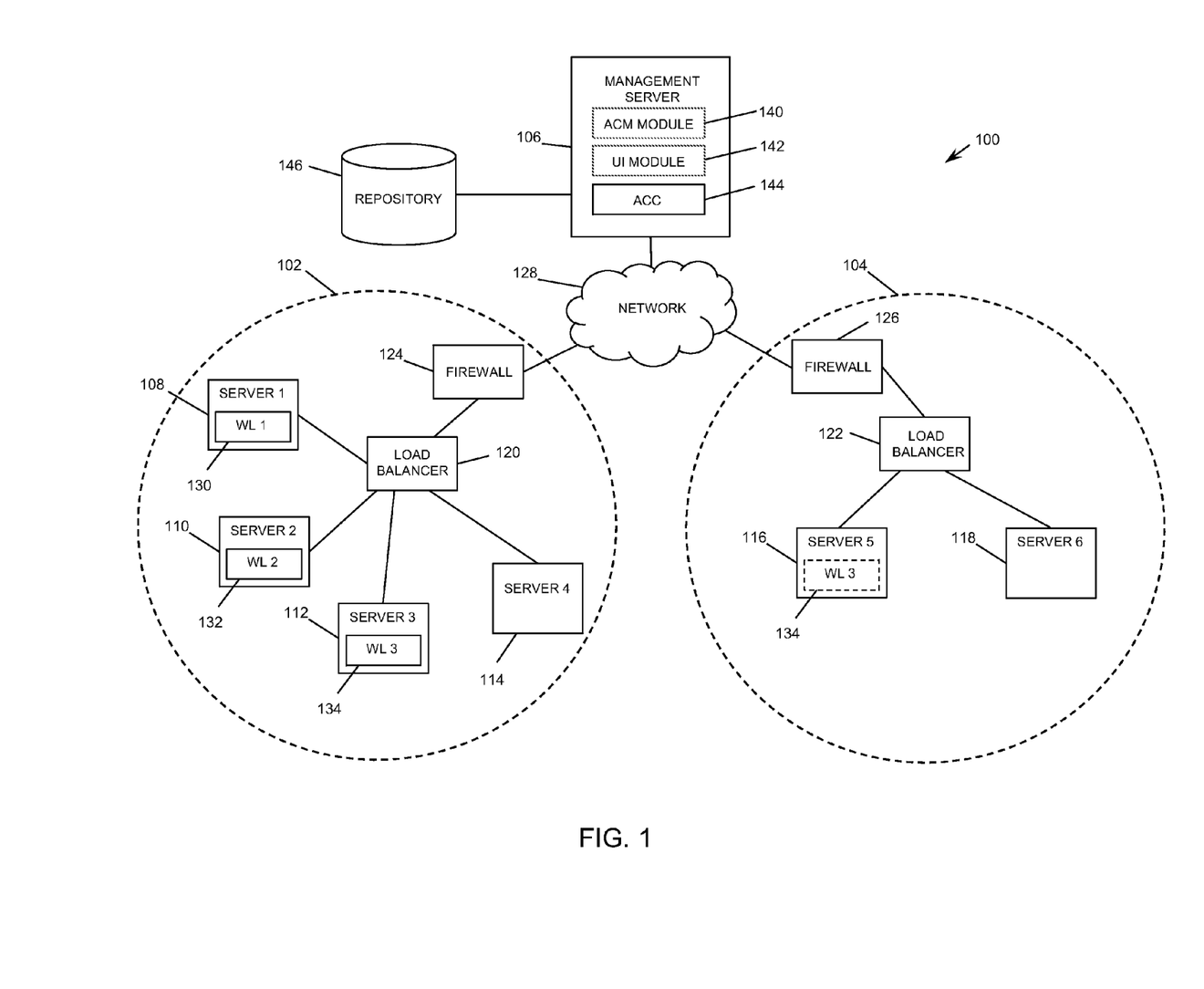
FIG. 1 illustrates an exemplary network system in accordance with embodiments of the subject matter described herein.

FIG. 1 is a block diagram illustrating an exemplary network system, generally designated 100, according to an embodiment of the subject matter described herein. Network system 100 includes network segments 102-104, which may comprise separate and distinct geographical locations (e.g., two separate data centers). Alternatively, network segments 102-104 can comprise disparate sections or partitions that are co-located at a common geographical site (e.g., a single data center). As illustrated in FIG. 1, each of network segments 102-104 includes a plurality of infrastructure elements that may be grouped in a subsystem tiered structure. For example, network segment 102 may include a first subsystem tier that comprises a plurality of infrastructure elements, such as servers 108-114 (e.g., computer network servers, application servers, file servers, database servers, web servers, mail servers, and/or the like), a load balancer 120, and a firewall 124. Similarly, network segment 104 may include a second subsystem tier comprising servers 116-118, a load balancer 122, and a firewall 126. Although FIG. 1 only depicts two subsystem tiers, it is understood that system network 100 may include additional subsystem tiers that contain any number of additional infrastructure elements without departing from the scope of the disclosed subject matter.

In some embodiments, network segments 102-104 may be communicatively linked through communications network 128 (e.g., the Internet) via firewalls 124-126. In such embodiments, each of firewalls 124-126 may include either a hardware based device (e.g., a router) or a software firewall service hosted by a hardware-based network element, such as a gateway. Network system 100 may further include a management server 106 that is communicatively connected to network segments 102-104 via communications network 128. In some embodiments, management server 106 may include an administrative configuration management (ACM) module 140, a user interface (UI) module 142, and at least one application control configuration 144. In some embodiments, UI module 142 may provide and support a user interface that can be utilized by a system administrator to manage an application and the associated infrastructure components used to facilitate the managed application. In some embodiments, the user interface supported by UI module 142 may include a graphical user interface (GUI) that is implemented either as a remote service using a remote presentation protocol (e.g., an HTML5 service) or as a dedicated application. The user interface supported by UI module 142 may also include a command line interface (CLI). The functionalities of ACM module 140 and application control configuration 144 are described in greater detail below. In some embodiments, network system 100 may further include a repository 146, which may be configured to store infrastructure element configuration information (e.g., data indicating which infrastructure elements are supporting an application) as well as credential information related to the identified infrastructure elements. Although repository 146 is depicted as having a direct connection to management server 106, repository 146 may be positioned elsewhere in system 100 and accessible by management server 106 via network 128 without departing from the scope of the disclosed subject matter.

In some embodiments, the infrastructure elements of network segment 102 may be collectively utilized to host and support the execution of an application managed by a system administrator. As used herein, an "application" may include any application program that utilizes a plurality of workload services (e.g., subprograms, processes, software algorithms, etc.) to perform an activity or service that may be useful to a user. Exemplary applications include, but are not limited to, an electronic mail service application, a web-based banking application, a multimedia streaming application, and the like. Notably, management server 106 may be utilized to initially establish an application control configuration 144 for a particular application managed by the system administrator. In some embodiments, application control configuration 144 can comprise a listing of infrastructure elements that support the workload services that execute and operate the application as well as the credential information associated with each of the listed infrastructure elements. As used herein, a credential information can include authorization and/or authentication information (e.g., access passwords, access cookies, access tokens, cryptographic keys, etc.) pertaining to an infrastructure element. Application control configuration 144 may also establish and list authorization and authentication rights to each of the infrastructure elements associated with the managed application for a corresponding system administrator.

As an example, servers 108-112 in network segment 102 may be assigned to support workload services 130-134 of a particular application. In such a scenario, a system administrator responsible for managing the application would be designated as such by application control configuration 144 and consequently be granted access to the credential information corresponding to servers 108-112 (i.e., the servers hosting workload services 130-134 of the application). In addition, the system administrator would also be granted administrative access via application control configuration 144 to load balancer 120 and firewall 124, which support servers 108-112.

In some embodiments, a new infrastructure element may be added to a subsystem tier to assist with the support of an existing workload service or a new workload service associated with the managed application. For example, if the managed application requires additional processing support for workload service 134, a new server 114 may be added to the subsystem tier illustrated in network segment 102. Notably, the deployment of server 114 necessitates that load balancer 120 and firewall 124 are modified (i.e., configured) to function properly with the newly added infrastructure element (e.g., an auxiliary infrastructure element). In order to perform the modification to load balancer 120 and firewall 124, the requisite administrative access to these infrastructure support components may be provided to a system administrator by ACM module 140. In some embodiments, ACM module 140 detects the addition of server 114 in network segment 102 and subsequently accesses (e.g., via a query message) repository 146 in order to determine and/or identify the infrastructure elements providing network support to server 114. In some embodiments, ACM module 140 detects the addition of server 114 by accessing/referencing a topology map that has been previously modified by the software tool or entity that has since deployed server 114 in the network. In some embodiments, ACM module 140 may utilize an application programming interface (API) to access repository 146. In this example, ACM module 140 may determine (from data provided by repository 146) that newly deployed server 114 is communicatively connected to load balancer 120 and firewall 124. Moreover, ACM module 140 may subsequently obtain the appropriate access credentials for the identified load balancer 120 and firewall 124 from repository 146.

Once the supporting infrastructure elements are identified and the corresponding credential information is obtained, ACM module 140 may update application control configuration 144. Specifically, application control configuration 144 may be updated such that administrative access is revised to reflect the system administrator's authorization and access to server 114 as well as load balancer 120 and firewall 124. After application control configuration 144 is updated, the system administrator may access and reconfigure load balancer 120 and firewall 124 in order to implement the requisite changes in these infrastructure elements that will enable server 114 to function in the subsystem tier (and provide processing support to workload service 134). For example, one or more firewall rules for firewall 124 may be modified to enable a newly added server 114 to communicate with any upstream and downstream services. Similarly, load balancer rules may be updated thereby notifying load balancer 120 of the existence of new server 114, thereby enabling traffic to be forwarded to server 114.

In another exemplary scenario, an entire workload service may be migrated from one infrastructure element to an auxiliary infrastructure element. For example, if for capacity or failure reasons a new infrastructure element is to be implemented on a different network segment or on a different server entirely, the administrator may automatically be granted sufficient administrative rights to all the appropriate supporting services. As an example, if server 112 failed for any reason, such a failure would be detected by ACM module 140. Consequently, ACM module 140 (or the system administrator) may then migrate workload 134 (which was supported by failed server 112 and previously copied on a backup storage device) to an auxiliary infrastructure element. In this example, ACM module 140 may select server 116 (e.g., an unused server selected by a system administrator from a pool of unassigned resources) in network segment 104 to support workload service 134. Upon migrating workload service 134 from server 112 to server 116, ACM module 140 dynamically updates administrative control configuration 144 of the modified application to reflect the change (e.g., removal of server 112 and addition of server 116). After migrating workload service 134, ACM module 140 accesses repository 146 in order to determine the infrastructure elements providing network support to server 116. For example, ACM module 140 may determine from information obtained from repository 146 that server 116 is communicatively connected to load balancer 122 and firewall 126. ACM module 140 may then subsequently obtain the appropriate access credentials for load balancer 122, firewall 126, and server 116 from repository 146. Upon obtaining the access credentials, ACM module 140 may be configured to update application control configuration 144. Notably, application control configuration 144 is updated such that administrative access to the identified infrastructure elements is revised to enable the system administrator to configure load balancer 122, firewall 126, and server 116 in a manner in which these components are able to support migrated workload service 134 (now at server 116).

In some embodiments, ACM module 140 may be configured to utilize a converged infrastructure shell to customize and/or restrict the administrative access afforded to a system administrator. For example, ACM module 140 may be configured to dynamically modify application control configuration 144 such that the system administrator's administrative access and operational commands are restricted to the infrastructure elements that are presently supporting the workload services executing a managed application. Notably, upon the migration of workload service 134 from server 112 to server 116 as described above, application control configuration 144 may be updated by ACM module 140 in order to remove a system administrator's administrative access to server 112. In addition, if server 112 was communicatively connected to a load balancer and/or a firewall that was not utilized by other servers supporting the application, ACM module 140 may be further configured to similarly restrict administrative access to that load balancer and/or firewall. Moreover, the aforementioned converged infrastructure shell may be utilized by ACM module 140 to abstract commands in such a manner that ensures a system administrator can only make changes that are applicable to the application the system administrator is managing. Such a mechanism enables ACM module 140 to prevent an administrator from overwriting or changing other configurations on a shared infrastructure element.

It will be appreciated that FIG. 1 illustrates an exemplary embodiment and that various nodes, their locations, and/or their functions as described above in relation to FIG. 1 may be changed, altered, added, or removed.

Figure 2:
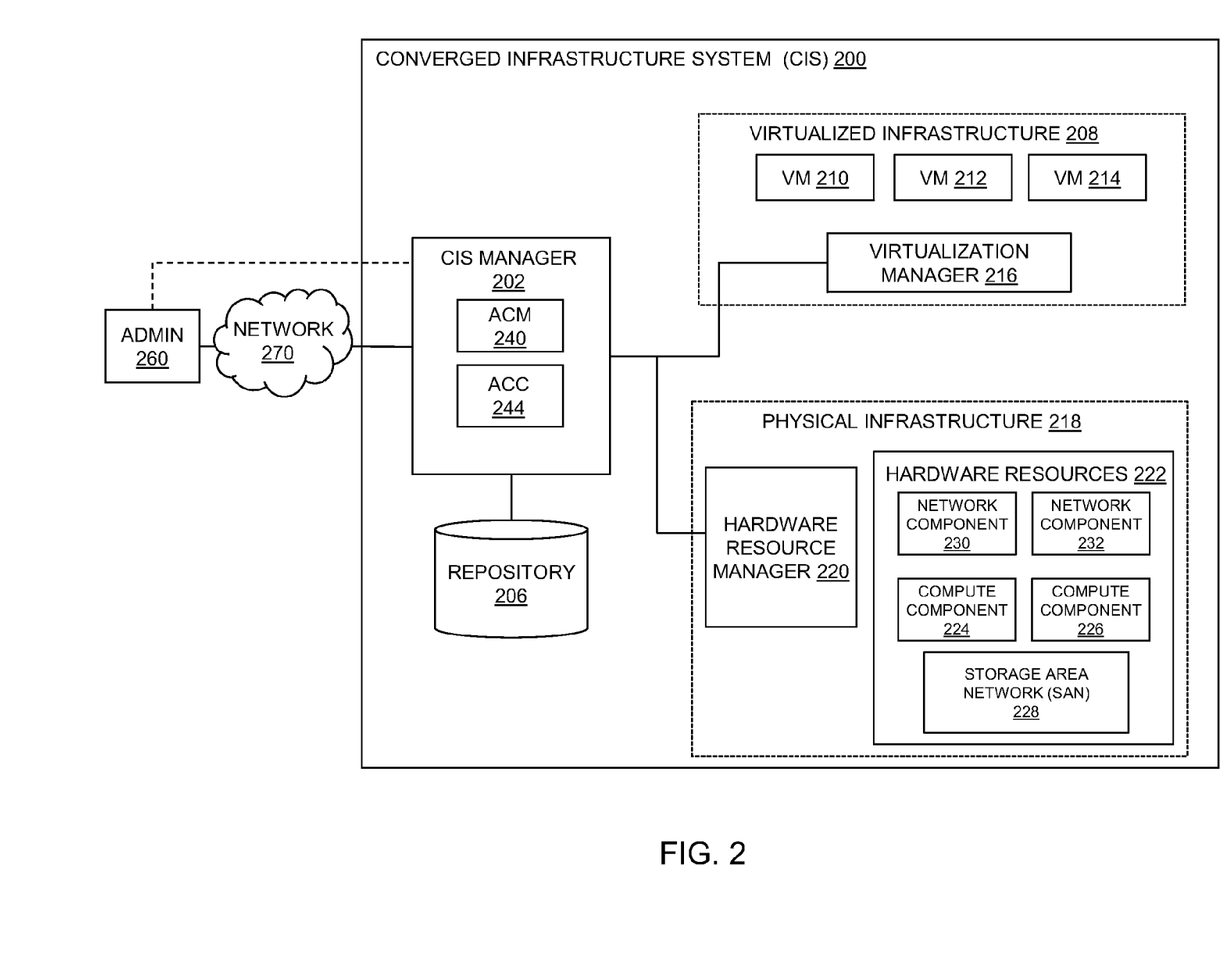
FIG. 2 illustrates an exemplary converged infrastructure system in accordance with embodiments of the subject matter described herein.

As indicated above, the disclosed subject matter can also be utilized in a converged infrastructure system. FIG. 2 is a diagram illustrating exemplary CIS 200 according to an embodiment of the subject matter described herein. In some embodiments, CIS 200 can comprise one or more physical resources and one or more virtual resources. Exemplary physical resources can comprise a processor, a compute device, network equipment, a router, a switch, wiring or cabling, a storage device, a physical port, and/or a communications interface. Exemplary virtual resources can comprise a virtual entity (e.g., an entity that appears as a physical entity but comprises one or more CIEs associated with one or more CISs), a virtual machine, a virtual server, a virtual storage device, a virtual port, and/or a virtual communications interface. CIS 200 may also comprise software and related CIEs for managing the CIS and/or portions therein.

In some embodiments, CIS 200 can be configured to provide data center functionality, cloud service functionality, and/or other IT functionality which can support a vast number of software workloads. CIS 200 can also be configured to communicate with various other entities, such as other CISs, network nodes, and users. For example, user 260 (e.g., a human administrator/operator or an automated system) may use an API, a command line interface, or web-based graphical user interface to login to CIS 200 to access CIS manager 202. In some embodiments, user 260 may establish communication directly to CIS 100 without use of network 270.

In some embodiments, CIS 200 can comprise a CIS manager 202 (e.g., a CIS management module), a repository 206, a virtualized infrastructure 208, and/or a physical infrastructure 218. CIS manager 202 may be any suitable entity for managing the operation of CIS 200 and may be configured to communicate with various CIEs, such as virtual resources, physical resources, and/or software for managing various CIEs. For example, CIS manager 202 may be configured to manage performance, resource utilization levels, and other aspects associated with virtualized infrastructure 208 and/or physical infrastructure 218. In some embodiments, CIS manager 202 comprises VCE Vision™ Intelligent Operations software and/or firmware.

In some embodiments, CIS manager 202 may be provisioned with an application configuration management (ACM) module 240 and at least one application control configuration 244. In some embodiments, ACM module 240 can be utilized to manage infrastructure elements (e.g., CIEs) that are necessary to execute an application. For example, ACM module 240 can be configured to request a list identifying CIEs that are involved with the execution of an application from repository 206. In some embodiments, ACM module 240 may utilize an API interface (e.g., a RESTful API) to communicate with repository 206. ACM module 240 may subsequently query repository 206 for credential information associated with the identified CIEs and subsequently update application control configuration 244. Notably, application control configuration 244 establishes and designates a system administrator's administrative access to the specific CIEs that are supporting workload services executing the application managed by the system administrator. In some embodiments, ACM module 240 and application control configuration 244 may be respectively configured to perform all of the functionalities and tasks as disclosed above with regard to ACM module 140 and application control configuration 144 in FIG. 1. Additional functionalities and capabilities of ACM module 240 and application control configuration 244 with respect to CIS 200 will be described in further detail below.

In some embodiments, virtualized infrastructure 208 can comprise a virtualization environment configured to simulate components of a computing device, e.g., a processor, system memory, and a storage device, for executing one or more virtual machines (VMs). For example, each of VM 210, VM 212, and VM 214 may be configured to perform various functions and/or services, such as web server functions or cloud application services, and may interact with various nodes, components, and/or users. In some embodiments, virtualized infrastructure 208 may be associated with one or more virtual entities. Each virtual entity can comprise one or more CIS or portions therein. In some embodiments, virtualization manager 216 may allow logical entities to be created, deleted, or modified using an API, a GUI, or a CLI. Virtualization manager 216 may be any suitable entity (e.g., software executing in a virtual machine) for managing aspects associated with virtualized infrastructure 208. In some embodiments, virtualization manager 216 may be configured to provide data center management through one or more communications interfaces. For example, virtualization manager 216 may communicate with one or more third-party management tools using APIs.

Physical infrastructure 218 can comprise hardware resources 222, such as network components 230-232, compute components 224-226 (sometimes referred to as "hosts", compute devices, and/or compute servers), and one or more storage area networks (SAN), such as SAN 228. In some embodiments, one or more file share storage (FSS) systems (not shown) can be utilized to provide file system level access to a CIS across a local area network (LAN). Hardware resources 222 may be communicatively connected to various other components in CIS 200 and other entities. Hardware resources 222 can be configured to be used by one or more virtual entities. In some embodiments, network components 230-232 (e.g., network switches) may be configured to enable communication between the resources within the CIS. For example, compute component 224 and SAN 228 may be used in implementing VM 210 and VM 212 and compute server 226 and SAN 228 may be used in implementing VM 214 and virtualization manager 216.

In some embodiments, compute components 224-226 can include a hypervisor that may be configured to function as a host operating system and/or a virtual machine that runs as one or more guest application (e.g., operating system) within the hypervisor. As used herein, the term "hypervisor" can refer to computer software, firmware and/or hardware that is responsible for creating, hosting and managing guest virtual machines running on a host machine. In some embodiments, a hypervisor can be configured to function as a host operating system configured to host one or more guest operating systems. Notably, each guest operating system can function within the hypervisor as a virtual machine and provide a platform to various workload services of an application. As previously indicated, compute components 224-226 can be configured to implement virtual machines 210-214. Specifically, virtual machines 210-214 can be configured to host virtual entities including a virtual machine, a virtual server, a virtual storage device, a virtual port, and/or a virtual communications interface, and can require a virtualization software specific credential. In some embodiments, credentials for virtual machines 210-214 and the hypervisors supported by compute components 224-226 can be stored in repository 206 and may be accessible by ACM module 240.

Hardware resource manager 220 may be any suitable entity (e.g., software executing in a virtual machine) for managing aspects associated with physical infrastructure 218. In some embodiments, hardware resource manager 220 may be configured to provision hardware resources 222 via one or more communications interfaces. For example, hardware resource manager 220 may provision hardware resources 222 for implementing one or more virtual entities in virtualized infrastructure 208.

Repository 206 may comprise any data storage unit (e.g., a database or plurality of databases) that may be configured to function as a centralized administrative password and credential storage unit for the CIEs of CIS 200. Although FIG. 2 depicts repository 206 as a local data storage unit residing on CIS 200, repository 206 can also be embodied as a data storage unit located at a public distributed content site, on a local proxy server in a customer's environment, or on a different CIS without departing from the scope of the disclosed subject matter. In some embodiments, repository 206 may be configured to store CIE configuration information (e.g., data indicating which CIEs are supporting an application) as well as credential information related to the identified CIEs. Likewise, the CIE configuration information and credential information in repository 206 may be accessed and obtained by ACM module 240.

In some embodiments, a new infrastructure element may be added to CIS 200 to assist with the support of an existing workload service or a new workload service associated with a managed application. For example, if a managed application presently supported by virtual machines 210-212 requires additional processing support for a particular workload service (not shown), a new virtual machine 214 may be deployed. Notably, the deployment of virtual machine 214 necessitates that the network component (e.g., network component 232) and server component (e.g., compute server 226) hosting the hypervisor responsible for managing virtual machine 214 are modified to properly execute virtual machine 214.

In order to perform the modification(s) to network component 232 and compute server 226, a system administrator requires administrative access to these CIEs. In some embodiments, ACM module 240 detects the addition of virtual machine 214 and subsequently accesses repository 206 in order to determine the infrastructure elements providing support to virtual machine 214. In this example, ACM module 140 may determine from the stored configuration information that newly deployed virtual machine 214 is being supported by network component 232 and compute server 226 and may subsequently obtain the appropriate access credentials for these CIEs from repository 206.

Once the supporting CIEs are identified and the corresponding credential information is obtained, ACM module 240 may update application control configuration 244. Specifically, application control configuration 244 may be updated such that administrative access is revised to reflect the system administrator's authorization and access to network component 232, server 226, and the hypervisor (not shown) on compute server 226. After application control configuration 244 is updated, the system administrator may access and reconfigure the CIEs and the hypervisor in order to implement the requisite changes in these infrastructure elements that will enable virtual machine 214 to provide processing support to the aforementioned workload service.

In some embodiments, ACM module 240 may be configured to generate an application configuration topology map that may be used to visually link the CIEs associated with executing the managed application. Such a visual representation may also include other information or metadata regarding each CIE, each workload service, and/or other related information pertinent to configuring and executing an application in such an environment. In some embodiments, the topology map may depict the CIEs in a manner in which the CIEs are arranged and/or positioned within the CIS. Similarly, credential information sets may be visually linked to correlated CIEs, thereby creating a topology map (or some other visual display) that provides a chain of access credentials required to perform the application selected by a system administrator.

Notably, ACM module 240 may automatically revise the topology map to reflect the modifications made to the execution of the application (e.g., addition or removal of a CIE supporting the application). For example, if a workload service is migrated to an auxiliary compute server (e.g., to recover from a failure scenario), the application configuration topology map associated with the application is automatically updated to reflect the change caused by the migration. If a compute server is added or removed, then those servers are automatically added or deleted from the set of managed devices indicated in application control configuration 244 and reflected in the generated application configuration topology map. Furthermore, if the change in the CIS compute servers requires a change in the set of network services used by the application (e.g., firewalls, load balancers, etc.), those network services are also inserted or removed from the managed set of devices and the displayed in the application configuration topology map. The system administrator therefore may be immediately directed to manage any new infrastructure element and will always be provided with access to all resources necessary to manage the entire application, irrespective of the location of each of the infrastructure elements (e.g., compute servers and network components). However, as indicated above, the system administrator has no access to infrastructure elements (and supported virtual components) that are not associated with the application at that instance in time, thereby improving security and avoiding other potential issues that may adversely impact CIS operations.

It will be appreciated that FIG. 2 illustrates an exemplary embodiment and that various nodes, their locations, and/or their functions as described above in relation to FIG. 2 may be changed, altered, added, or removed.

Figure 3:
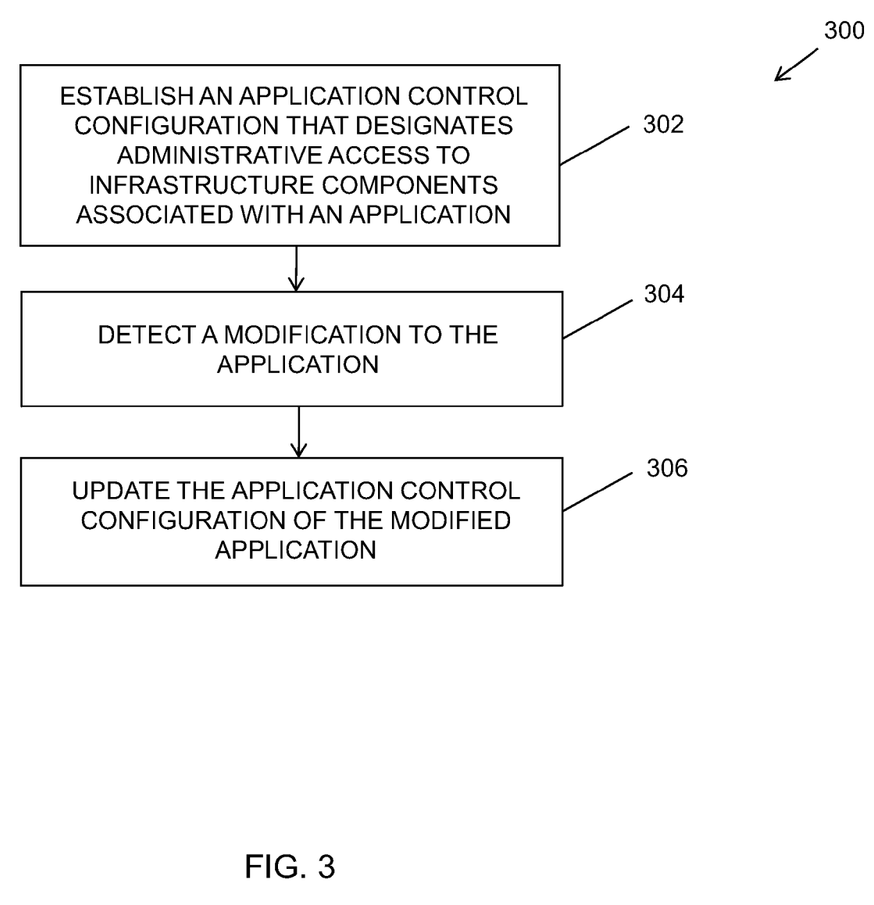
FIG. 3 illustrates a flow chart of an exemplary process for managing infrastructure elements in a network system in accordance with embodiments of the subject matter described herein.

FIG. 3 illustrates a flow chart of an exemplary process 300 for managing infrastructure elements in accordance with embodiments of the subject matter described herein. At step 302, an application control configuration that designates administrative access to infrastructure elements associated with an application is established. In one example with reference to FIG. 1, ACM module 140 may be configured to establish application control configuration 144 for an application managed by system administrator. For instance, ACM module 140 can be configured to query repository 146 for information that identifies one or more infrastructure elements that are involved or associated with supporting the workload services of the application managed by the system administrator. Notably, application control configuration 144 can include a listing of all infrastructure elements that are needed to support and execute an application that is being managed by the system administrator. In addition, the application control configuration can also include credential information (e.g., obtained from repository 146) associated with each of the infrastructure elements identified as being needed to execute or support the managed application.

At step 304, a modification to the application is detected. In some embodiments, the modification to the managed application may include the addition of an auxiliary infrastructure element or the migration of a workload service to an auxiliary infrastructure element in the network system. For example, the modification to the application can involve the deployment of a new server to assisting with the processing of a workload service (e.g., for complying with the requirements of a service level agreement). Similarly, a modification to the application may also pertain to the migration of a workload service from a failed infrastructure element to a backup infrastructure element (either in a common network segment or a disparate network segment). Continuing with the example in step 302, ACM module 140 in FIG. 1 may detect the migration of workload service 134 from server 112 to server 116.

At step 306, the application control configuration of the modified application is updated. In some embodiments, ACM module 140 revises the administrative access associated with each of the infrastructure elements supporting a workload service executing the modified application. Continuing with the example in step 304, ACM module 140 in FIG. 1 queries repository 146 to determine the infrastructure elements that support newly utilized server 116. Notably, ACM module 140 determines that load balancer 122 and firewall 126 provide network support to server 116. ACM module 140 may then query repository 146 to obtain credential information associated with each of load balancer 122, firewall 126, and server 116 and subsequently updates application control configuration 144 to revise the system administrator's administrative access as it relates to the managed application. Moreover, ACM module 140 may modify application control configuration 144 to restrict the system administrator's administrative access by removing any infrastructure element (e.g., server 112) that is no longer used to support the application from application control configuration 144.

Figure 4:
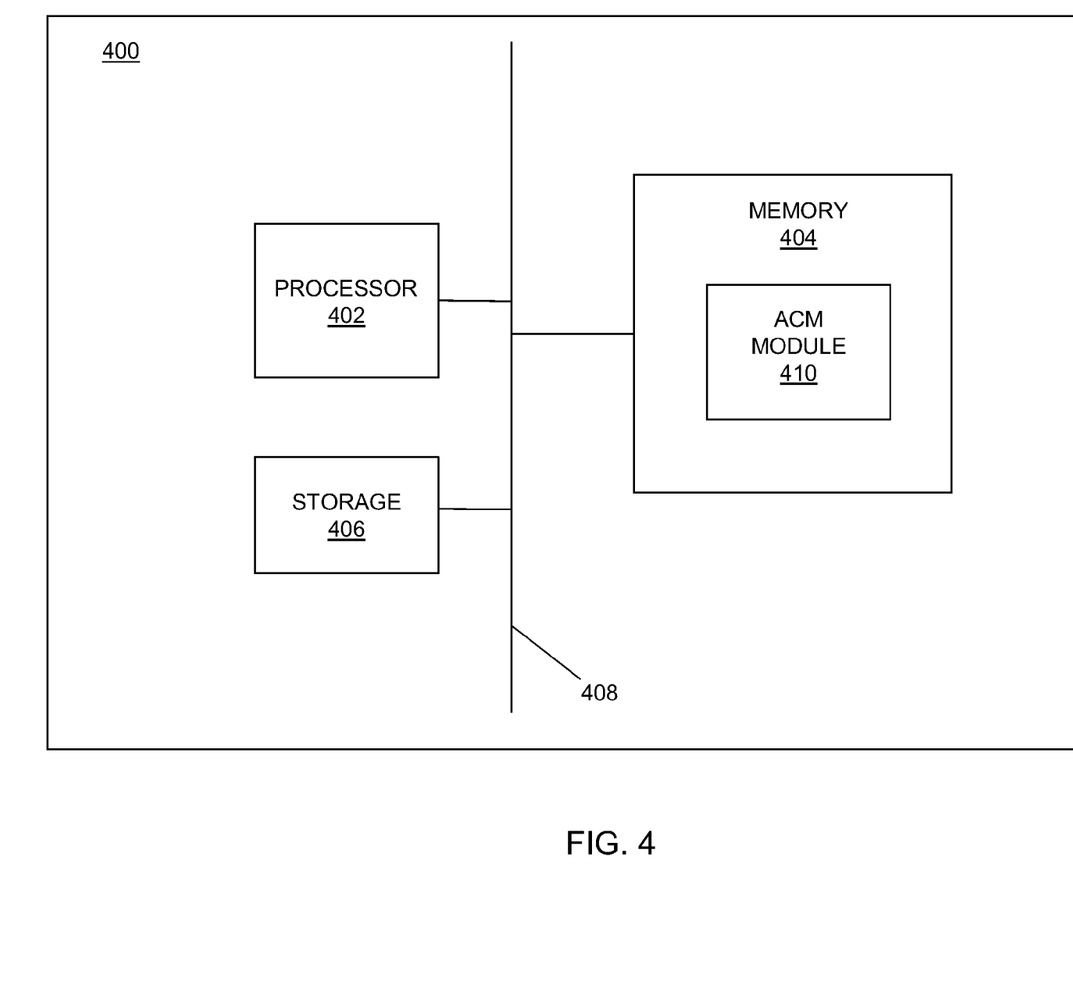
FIG. 4 illustrates a block diagram of a general purpose computer system suitable for use in performing the functions described herein.

FIG. 4 depicts a high level block diagram of a general purpose computer system suitable for use in performing the functions described herein. As depicted in FIG. 4, system 400 comprises one or more processors 402, one or more memory modules 404, one or more storage devices 406, and communicatively connected via a system bus 408. In some embodiments, processor 402 can comprise can comprise a microprocessor, central processing unit (CPU), or any other like hardware based processing unit. In some embodiments, an ACM 410 can be stored in memory 404, which can comprise random access memory (RAM), read only memory (ROM), optical read/write memory, cache memory, magnetic read/write memory, flash memory, or any other non-transitory computer readable medium. In some embodiments, processor 402 and memory 404 can be used to execute and manage the operation of ACM 410. In some embodiments, storage device 406 can comprise any storage medium or storage unit that is configured to store data accessible by processor 402 via system bus 408. Exemplary storage devices can comprise one or more local databases hosted by system 400. In some examples, system 400 may be embodied as management server 106 in FIG. 1 or CIS 200 in FIG. 2.

As indicated above, the subject matter described herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions which, when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. As used herein, the terms "function" or "module" refer to hardware, firmware, or software in combination with hardware and/or firmware for implementing features described herein.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for managing infrastructure elements in a network system, the method comprising:
  establishing, for an application managed by a user, an application control configuration that designates administrative access to infrastructure elements comprising both host servers supporting a plurality of workload services that executes the application and server support elements that support the host servers, wherein the application control configuration establishes and lists authorization and authentication rights to each of the infrastructure elements associated with the application;
  detecting a modification to the application that causes one or more of the workload services to be transferred to at least one auxiliary host server;
  updating, in response to the detected modification, the application control configuration such that the administrative access is revised to enable the user to manage each of the host servers supporting the workload services executing the modified application and each of the server support elements supporting the host servers, wherein updating the application control configuration includes obtaining credential information associated with each of the host servers supporting the workload services executing the modified application and each of the server support elements supporting the host servers and revising the application control configuration based on the obtained credential information, wherein the credential information includes a cryptographic key, wherein revising the application control configuration includes removing the user's administrative access to a host server that originally supported any of the workload services that executed the application and is not presently supporting any of the workload services executing the modified application and removing the user's administrative access to one or more server support elements supporting the host server; and
  utilizing the application control configuration to generate an application configuration topology map that visually links the host servers supporting the workload services executing the modified application and the server support elements supporting the host servers, wherein the application configuration topology map is automatically revised to reflect modifications made to the application control configuration upon the workload services being transferred to the at least one auxiliary host server.

2. The method of claim 1 wherein the modification to the application includes at least one action selected from a group consisting of adding at least one auxiliary host server to the host servers, replacing one of the host servers with the at least one auxiliary host server, and removing at least one of the host servers.

3. The method of claim 1 wherein the infrastructure elements are distributed over disparate network segments of a network system.

4. The method of claim 1 wherein the infrastructure elements include converged infrastructure elements (CIEs) located within a converged infrastructure system (CIS).

5. The method of claim 1 wherein each of the infrastructure elements and the auxiliary infrastructure elements is selected from a group consisting of a firewall, a load balancer, a router, a storage device, a virtual machine, a hypervisor, and a server.

6. The method of claim 1 wherein updating the application control configuration comprises querying a repository to obtain data for revising the application control configuration associated with the modified application.

7. A system for managing system components in a network system, the system comprising:
  at least one processor;
  memory; and
  an application configuration management (ACM) module utilizing the at least one processor and the memory, wherein the ACM module is configured to:

establish, for an application managed by a user, an application control configuration that designates administrative access to infrastructure elements comprising both host servers supporting a plurality of workload services that executes the application and server support elements that support the host servers, wherein the application control configuration establishes and lists authorization and authentication rights to each of the infrastructure elements associated with the application;

detect a modification to the application that causes one or more of the workload services to be transferred to at least one auxiliary host server, and, in response to the detected modification; and update the application control configuration such that the administrative access is revised to enable the user to manage each of the host servers supporting the workload services executing the modified application and each of the server support elements supporting the host servers, wherein the ACM module is further configured to obtain credential information associated with each of the host servers supporting the workload services executing the modified application and each of the server support elements supporting the host servers, wherein the credential information includes a cryptographic key, and to revise the application control configuration based on the obtained credential information by at least removing the user's administrative access to a host server that originally supported any of the workload services that executed the application and is not presently supporting any of the workload services executing the modified application and remove the user's administrative access to one or more server support elements supporting the host server, wherein the ACM module is further configured to utilize the application control configuration to generate an application configuration topology map that visually links the infrastructure elements supporting the workload services executing the modified application, and wherein the ACM module is further configured to automatically revise the application configuration topology map to reflect modifications made to the application control configuration upon the workload services being transferred to the at least one auxiliary infrastructure element.

8. The system of claim 7 wherein the modification to the application includes at least one action selected from a group consisting of adding at least one auxiliary infrastructure element to the infrastructure elements, replacing one of the infrastructure elements with the at least one auxiliary infrastructure element, and removing at least one of the infrastructure elements.

9. The system of claim 7 wherein the infrastructure elements are distributed over disparate network segments of a network system.

10. The system of claim 7 wherein the infrastructure elements include converged infrastructure elements (CIEs) located within a converged infrastructure system (CIS).

11. The system of claim 7 wherein each of the infrastructure elements and the auxiliary infrastructure elements is selected from a group consisting of a firewall, a load balancer, a router, a storage device, a virtual machine, a hypervisor, and a server.

12. The system of claim 7 wherein the ACM module is further configured to query a repository to obtain data for revising the application control configuration associated with the modified application.

13. A non-transitory computer readable medium having stored thereon executable instructions which, when executed by a processor of a computer, cause the computer to perform steps comprising:

establishing, for an application managed by a user, an application control configuration that designates administrative access to infrastructure elements comprising both host servers supporting a plurality of workload services that executes the application and server support elements that support the host servers, wherein the application control configuration establishes and lists authorization and authentication rights to each of the infrastructure elements associated with the application;

detecting a modification to the application that causes one or more of the workload services to be transferred to at least one auxiliary host server;

updating, in response to the detected modification, the application control configuration such that the administrative access is revised to enable the user to manage each of the host servers supporting the workload services executing the modified application and each of the server support elements supporting the host servers, wherein updating the application control configuration includes obtaining credential information associated with each of the host servers supporting the workload services executing the modified application and each of the server support elements supporting the host servers and revising the application control configuration based on the obtained credential information, wherein the credential information includes a cryptographic key, wherein revising the application control configuration includes removing the user's administrative access to a host server that originally supported any of the workload services that executed the application and is not presently supporting any of the workload services executing the modified application and removing the user's administrative access to one or more server support elements supporting the host server; and utilizing the application control configuration to generate an application configuration topology map that visually links the host servers supporting the workload services executing the modified application and the server support elements supporting the host servers, wherein the application configuration topology map is automatically revised to reflect modifications made to the application control configuration upon the workload services being transferred to the at least one auxiliary host server.

14. The non-transitory computer readable medium of claim 13 wherein the modification to the application includes at least one action selected from a group consisting of adding the at least one auxiliary infrastructure element to the infrastructure elements, replacing one of the infrastructure elements with the at least one auxiliary infrastructure element, and removing at least one of the infrastructure elements.

15. The non-transitory computer readable medium of claim 13 wherein the infrastructure elements are distributed over disparate network segments of a network system.

16. The non-transitory computer readable medium of claim 13 wherein the infrastructure elements include converged infrastructure elements (CIEs) located within a converged infrastructure system (CIS).

17. The non-transitory computer readable medium of claim 13 wherein each of the infrastructure elements and the auxiliary infrastructure elements is selected from a group consisting of a firewall, a load balancer, a router, a storage device, a virtual machine, a hypervisor, and a server.

18. The non-transitory computer readable medium of claim 13 wherein updating the application control configuration comprises querying a repository to obtain data for revising the application control configuration associated with the modified application, wherein the data obtained from the repository includes credential information associated with each of the infrastructure elements and the at least one auxiliary infrastructure element.

\* \* \* \* \*